US005511315A

United States Patent [19]
Raya

[11] Patent Number: 5,511,315

[45] Date of Patent: Apr. 30, 1996

[54] CHAIN SAW WITH REINFORCING AND CUTTING ATTACHMENT

[76] Inventor: Ruben N. Raya, 946 W. Brook St., Santa Ana, Calif. 92703

[21] Appl. No.: 323,371

[22] Filed: Oct. 11, 1994

[51] Int. Cl.[6] .......... B23D 57/02; B23D 59/00

[52] U.S. Cl. .......... 30/371; 30/382; 30/383

[58] Field of Search .......... 30/371, 381, 382, 30/383

[56] References Cited

U.S. PATENT DOCUMENTS

| | | | |
|---|---|---|---|
| 2,797,717 | 7/1957 | Budd | 30/371 |
| 2,902,065 | 9/1959 | Graves et al. | 30/371 |
| 3,680,607 | 8/1972 | Robinson | 30/383 |
| 4,142,292 | 3/1979 | Ulrich | 30/371 |
| 4,270,272 | 6/1981 | Graham | 30/371 |
| 4,888,872 | 12/1989 | Eistrat | 30/382 |

*Primary Examiner*—Douglas D. Watts
*Attorney, Agent, or Firm*—Willie Krawitz

[57] ABSTRACT

An attachment for a chain saw is provided for adapting the saw blade to cut small diameter branches without weakening the saw blade holder or causing undesired kickback or jamming. The attachment comprises a pair of L-shaped cutting bars attached on both sides of the saw blade holder and spaced sufficiently apart to accommodate the width of the cutting chain. The cutting bars comprise a support portion and an angle portion, the support portion positioned approximately midway along the length of the saw blade holder and extending along a line parallel to the longitudinal axis of the saw blade holder. The angle portion of the cutting bars projects beyond the lower edge of the blade, and forms a wedge shaped angle or bight between the saw blade attachment and the cutting chain. During use, small diameter branches are drawn towards the forwardly projecting angle portions, and are compressed into the wedge shaped angle or bight by the cutting chain of the chain saw, where the teeth of the saw cut through the branches. The bight area assists the operator to align and guide the branches into a stable cutting position away from the hands and face of the user, thereby stabilizing the branches and saw with respect to each other, and reducing the tendency for undesired jamming and kickback. Removal of the cutting bars enables the chain saw to be used in a normal mode for cutting large sized branches, logs, and the like.

6 Claims, 1 Drawing Sheet

CHAIN SAW WITH REINFORCING AND CUTTING ATTACHMENT

BACKGROUND OF THE INVENTION

This invention relates to a new and improved attachment for chain saws, designed for adapting the saw to cut small branches, limbs and brush-like material without weakening the saw blade holder or causing undesired kickback.

A variety of chain saw attachments having particular application in cutting small diameter branches are known, and typical prior art devices are shown in U.S. Pat. Nos. 2,698,034; 2,813,556; 2,821,213; 2,902,065; 2,925,105; 2,930,416; 2,948,310; 3,380,493; 3,995,370; 4,270,272; 5,150,524. Some of these patents describe devices which provide an effective means for cradling small limbs and branches in the bight created between the saw blade attachment and the cutting chain. While many of these devices allow the force of the blade to compress and align the small diameter branches in the bight while the teeth of the chain saw cut through the foliage, these devices frequently weaken the saw blade holder or increase chain saw vibration. This will occur due to the distribution of stress over a limited section of the saw blade holder; or by inadequate attachment of these devices to the saw blade holder or to each other; or, by connection of the chain saw attachment to only one side of the saw blade holder.

However, none of the prior art devices provides a reinforcing and cutting attachment that more uniformly distributes the weight of the material being cut and distributes the force vector from the rotating chain saw blade more uniformly over a substantial length of the saw blade. Also, these prior art devices reduce the efficiency of the cutting operation due to vibration of the saw blade holder, and the vibration itself may induce structural failure.

Moreover, none of the prior art devices provide an attachment of sufficient stiffness and shear resistance to relieve instantaneous shocks or forces due to jamming or kickback along the longitudinal portion of the chain saw rather than along the attachment that holds the material being cut. Also, it would be helpful if the device could be quickly and easily installed, removed and reattached with a minimal amount of tools.

THE INVENTION

According to the invention, a reinforcing and cutting attachment for a chain saw is provided for adapting the saw to cut small branches, limbs and brush-like material without weakening the saw blade holder or causing undesired kickback, vibration or jamming.

The reinforcing and cutting attachment comprises a pair of rigid L-shaped cutting bars attached to each side of the chain saw holder and spaced sufficiently apart to accommodate the width of the cutting chain. A pair of reinforcing spacers are positioned between the cutting bars and along each side of the saw blade holder, and the cutting bars and spacers are secured thereto by lock nuts, and a spacing bolt. The cutting bars comprise a support portion and an angle portion, the support portion positioned approximately midway along the length of the chain saw and extending along the longitudinal axis of the saw blade holder. The angle portion of each cutting bar projects beyond the lower edge of the cutting chain, and forms a wedge shaped angle or bight between the saw blade attachment and the cutting chain.

When used for cutting thick branches and tree trunks, the attachment is removed and the chain saw is used in its usual mode. However, for cutting small diameter branches and for trimming purposes, the attachment is employed. When cutting in this latter mode, small branches are drawn towards and compressed into a wedge shaped bight between the cutting bars, and the cutting chain of the chain saw, thereby enabling the cutting chain to efficiently cut through the branches. Furthermore, the attachment assists the operator by aligning and guiding the material into a stable cutting position away from the hands and face of the user. Also, use of the attachment stabilizes the orientation of the branches and saw with respect to each other, and reduces the tendency of undesired jamming and kickback.

By using the chain saw attachment of this invention, the weight of the material being cut, and the force vector of the rotating cutting chain are transferred from the angle portions of the symmetrically shaped cutting bars to the reinforcing spacers and centrally positioned support components. Hence stress and vibration along the saw blade holder are reduced both by distributing these forces more uniformly over the length of the saw blade holder, and by transferring some of these forces to reinforcing members on each side of the chain saw.

Figure 1:
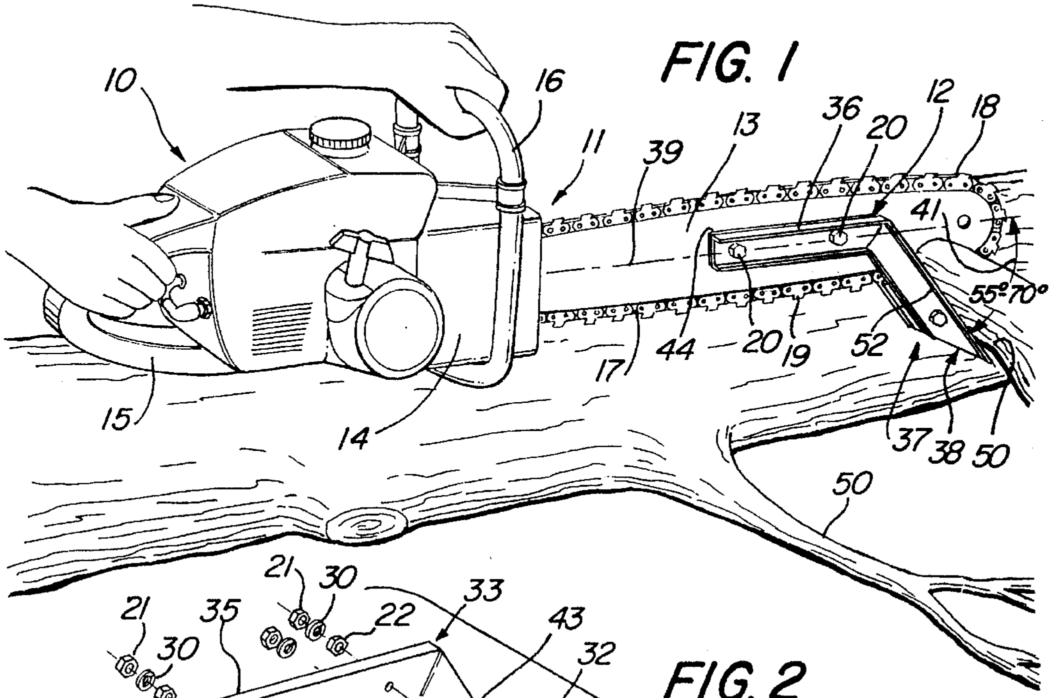
FIG. 1 is a perspective view illustrating the reinforcing and cutting attachment of the invention applied to a chain saw and shown in position of use during a cutting operation.
Figure 3:
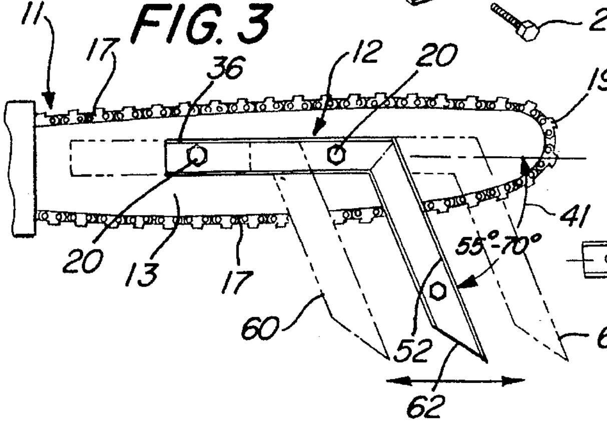
FIG. 3 is a side view illustrating the reinforcing and cutting attachment of the invention applied to a chain saw at different selected positions along the blade; and, FIG. 4 is a side view of the reinforcing and cutting attachment of this invention adjusted within preferred forward tilting angles.

DESCRIPTION OF THE PREFERRED EMBODIMENTS:

The assembly 10 of a chain saw 11 having an L-shaped reinforcing and cutting attachment 12 mounted thereon and positioned about midway along the length of the saw blade holder 13, is shown in FIGS. 1 and 3. The saw blade holder 13 extends from and is supported by an engine housing 14 having oval arm supports 15 and 16, and includes a slot or groove 17 extending around the periphery 18 thereof for guiding a cutting chain 19.

Figure 2:
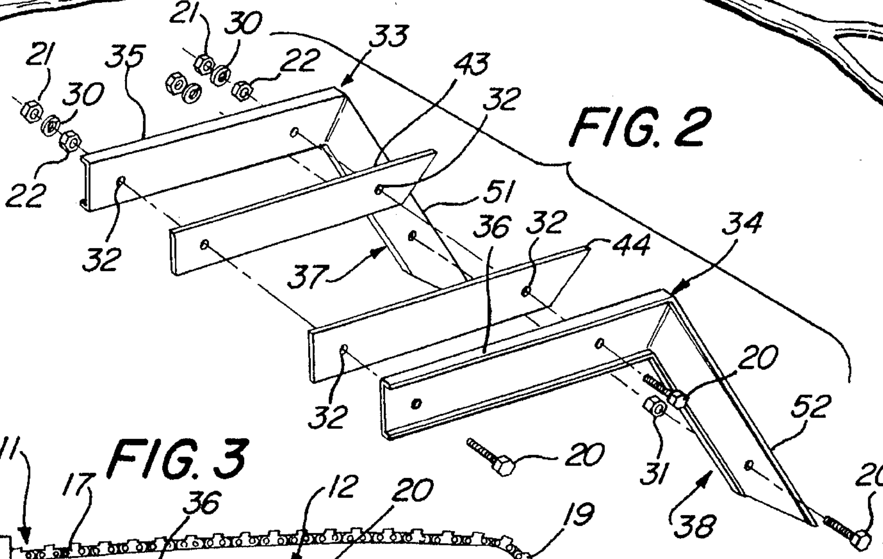
FIG. 2 is an upper perspective, exploded view of the reinforcing and cutting attachment of this invention.

The reinforcing and cutting attachment 12 may be manufactured of metal such as shock resistant steel or reinforced aluminum, and is suitable for mass production and stacking. As shown in the views of FIGS. 1–3, the attachment 12 may be removably attached to the saw blade holder 13 and secured from horizontal and vertical movement by means of a plurality of bolts 20, nuts 21, spacers 22, lock washers 30, and an oversized spacing nut 31. Bolts 20 pass through a series of bore holes 32 extending along the length of the attachment and through saw blade holder 13.

Figure 4:
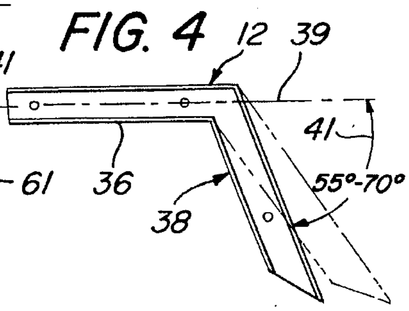

The reinforcing and cutting attachment 12 is formed into rigid, L-shaped, channel iron cutting bars 33 and 34, and comprises support portions 35 and 36 and angle portions 37 and 38. As shown in FIGS. 1 and 2, the support portions are attached on each side of the saw blade holder 13 parallel to its longitudinal axis 39, and approximately midway along its length. As shown in FIG. 4, the angle portions 37 and 38 of the attachment project beyond the lower edge of the cutting chain 19, at a wedge shaped angle or bight 41 of about 55° to 70° degrees. This range of bight angles enables sufficient compressing force for cutting while minimizing the risk of chain saw jamming. A pair of reinforcing spacers 43 and 44 are positioned between the support portions 35, 36 along each side of the saw blade holder 13, and space the support portions sufficiently from each other and the saw blade holder to accommodate the cutting chain 19, while securing the channel iron cutting bars 33 and 34 parallel to each other.

During use, small branches, brush and other foliage 50 are drawn towards the forwardly projecting contact surface 51 and 52 of the angle portions 37 and 38, and are compressed into the wedge shaped angle or bight 41 by the forward momentum of the cutting chain, thereby stabilizing both the branches 50 and saw blade 13 with respect to each other while aligning and guiding the material into a stable cutting position.

Under these conditions, the cutting chain 19 can cut through the branches without the risk of jamming, kickback or loss of chain saw control that is characteristic of chain saws with similar attachments.

As shown in FIG. 2, the reinforcing spacers 43, 44 and support portions 35 and 36 provide four horizontally oriented supports which reinforce the saw blade holder 13 and distribute stresses caused during a cutting operation. It will be appreciated that the weight of the branches 50 being cut, and the force exerted upon the branches by the cutting chain 19 are balanced more equally between the angle portions 37, 38 due to the symmetrical positioning of the angle portions on each side of the saw blade holder 13. Moreover, the attachment 12 effectively extends the reach of the operator and the chain saw 11, and forms a partial guard between the user and the cutting operation, thereby constituting a built-in safety feature.

FIG. 3 shows in dotted designation 60 and 61 the horizontal limits of the reinforcing and cutting attachment 12, while the preferred position 62 is shown in solid designation. In the forward position 61, the wedge shaped angle or bight 41 is at a minimum workable size, and is designed to accommodate only small branches and shrubs. The rearwardly oriented position 60 is sized to cut mainly larger branches up to about three inches in diameter, while avoiding undesired jamming, kickback or other cutting inefficiencies. In the preferred position 62, a wide variety of branch widths about ⅛" to 3", can be accommodated while distributing stresses more uniformly over the length of the saw blade holder 13. Preferably, the distance between the bight 41 and the tip of the saw blade holder 13, is about two inches to eight inches.

Typically, the reinforcing spacers 43 and 44 are about 2½"–10" long, about ¾"–2½" wide, and about 1⁄16"–¾" thick; support portions 35 and 36 are about 2½"–10" long, about ½"–1½" wide, and about ⅛"–1" thick; and, the angle portions 37 and 38 are about 4"–8" long, about ½"–1½" wide, and about ⅛"–1" thick.

I claim:

1. A hand-held, chain saw, comprising:

a.) a saw blade holder, defining a longitudinal major axis and a minor axis, and including an end-tipped portion;

b.) a cutting chain rotatably mounted on the saw blade holder;

c.) a pair of spaced apart cutting bars mounted on each side of the saw blade holder and secured thereto against longitudinal and vertical movement by means including bolts, nuts, spacers, lock washers and a spacing nut, each cutting bar defining a support portion and a single angle portion, the cutting bars being interconnected along their support portions and angle portions and removably mounted in a parallel oriented, opposed registry on each side of the blade holder, the angle portions projecting downwardly from the blade holder and beyond its lower edge to form therebetween a twin-shaped, bight angle which may be set from about 55° to about 70° defined between the longitudinal axis and a support portion of the cutting bar, the cutting bars being sufficiently spaced apart from each other and the saw blade holder to accommodate movement of the cutting chain, the twin-shaped, interconnected bight angles of the cutting bars forming a partial guard between a user and a cutting operation; whereby during use:

i. foliage, including branches and brush are drawn into and compressed in the twin-shaped bight angles by forward movement of the cutting chain, thereby stabilizing the foliage within the bight angles while aligning and guiding the foliage into a stable and efficient cutting position;

ii. the force exerted on the material by the cutting chain during cutting produce stresses whose magnitude and direction are transferred from the bight angles to the support portions of the cutting bars;

iii. the cutting bars reinforce the blade holder, and distribute the stresses thereon during use;

iv. the distance between the bight angle and the end-tipped portion of the saw blade holder may be varied from about two inches to about eight inches; and, v. the size of the foliage cut may be increased up to about three inches in diameter as the distance between the bight angle and the end-tipped portion of the saw blade holder is increased from about two inches to about eight inches.

2. The reinforcing and cutting attachment of claim 1, in which the reinforcing spacers are about 2½"–10" long, about ¾"–2½" wide, and about 1⁄16"–¾" thick; support portions are about 2½"–10" long, about ½"–1½" wide, and about ⅛"–1" thick; and, the angle portions are about 4"–8" long, about ½"–1½" wide, and about ⅛"–1" thick.

3. The chain saw of claim 1, in which the cutting bars are mounted on each side of the saw blade holder parallel to the longitudinal axis of the saw blade holder, and approximately midway along its length.

4. The chain saw of claim 1, in which the cutting bars are symmetrically positioned on each side of the saw blade holder, thereby enabling the cutting chain to exert a force on the foliage being cut whose magnitude and direction is equally balanced between each bight.

5. A hand-held chain saw, comprising:

a.) a saw blade holder, defining a longitudinal major axis and a minor axis, including an end-tipped portion;

b.) a cutting chain rotatably mounted on the saw blade holder;

c.) a pair of spaced apart, cutting bars mounted on each side of the saw blade holder and secured thereto against longitudinal and vertical movement by means including bolts, nuts, spacers, lock washers and a spacing nut, each cutting bar defining a support portion, and a single angle portion, the cutting bars being interconnected along their support portions and angle portions, and removably mounted in a parallel oriented, opposed registry on each side of the blade holder, the angle portions projecting downwardly from the blade holder and beyond its lower edge to form therebetween a twin-shaped bight angle which may be set from about 55° to about 70° defined between the longitudinal axis and a support portion of the cutting bar, the twin-shaped, interconnected bight angles of the cutting bars forming a partial guard between a user and a cutting operation; and, d.) reinforcing spacers supporting each cutting bar against each side of the saw blade holder, thereby maintaining the cutting bars parallel to each other and spaced sufficiently apart from each other and the saw blade holder to accommodate movement of the cutting chain; whereby, during use;

i. foliage, including branches and brush, are drawn into and compressed in the twin-shaped bight angles by forward movement of the cutting chain, thereby stabilizing the foliage within the bight angles while aligning and guiding the foliage into a stable and efficient cutting position;

ii. the force exerted on the material by the cutting chain during cutting produce stresses whose magnitude and direction are transferred from the bight angles to the support portions of the cutting bars;

iii. the cutting bars reinforce the blade holder, and distribute the stresses thereon, during use;

iv. the distance between the bight angle and the end-tipped portion of the saw blade holder may be varied from about two inches to about eight inches; and, v. the size of the foliage cut may be increased up to about three inches in diameter as the distance between the bight angle and the end-tipped portion of the saw blade holder is increased from about two inches to about eight inches.

6. The chain saw of claim 5, in which the cutting bars are positioned in registry on each side and about midway of the saw blade holder and along its longitudinal axis, thereby enabling the cutting chain to exert on the foliage a force having a magnitude and direction which is equally balanced between each angle portion.

* * * * *